United States Patent
Stadtfeld et al.

(10) Patent No.: US 7,364,391 B1
(45) Date of Patent: Apr. 29, 2008

(54) MANUFACTURING STRAIGHT BEVEL GEARS

(75) Inventors: Hermann J. Stadtfeld, Rochester, NY (US); Uwe Gaiser, Ostfildern (DE); Earl D. Ervay, Fairport, NY (US); Theodore J. Krenzer, West Rush, NY (US)

(73) Assignee: The Gleason Works, Rochester, NY (US)

( * ) Notice: Subject to any disclaimer, the term of this patent is extended or adjusted under 35 U.S.C. 154(b) by 0 days.

(21) Appl. No.: 11/543,611

(22) Filed: Oct. 4, 2006

Related U.S. Application Data (60) Provisional application No. 60/723,396, filed on Oct. 4, 2005.

(51) Int. Cl.
*B23F 17/00* (2006.01)
*B23F 5/20* (2006.01)

(52) U.S. Cl. .............. 409/2; 409/51; 409/50; 409/55; 700/194; 451/47; 451/900

(58) Field of Classification Search ........ 409/2, 409/10, 39, 40–41, 50–52, 55–57; 700/194; 451/47, 147, 161, 219, 253, 275, 900
See application file for complete search history.

(56) References Cited

U.S. PATENT DOCUMENTS

| | | | |
|---|---|---|---|
| 2,342,129 A | 2/1944 | Elbertz | |
| 2,567,273 A | 9/1951 | Carlsen | |
| 2,586,451 A | 2/1952 | Wildhaber | |
| 2,604,822 A | 7/1952 | Carlsen | |
| 2,775,921 A | 1/1957 | Carlsen | |
| 2,947,062 A | 8/1960 | Spear | |
| 4,930,950 A * | 6/1990 | Stadtfeld | 409/2 |
| 4,981,402 A | 1/1991 | Krenzer et al. | |
| 5,961,260 A | 10/1999 | Kasler et al. | |
| 6,712,566 B2 | 3/2004 | Stadtfeld et al. | |
| 2006/0285936 A1 * | 12/2006 | Muller et al. | 409/51 |

FOREIGN PATENT DOCUMENTS

GB 692806 6/1953

OTHER PUBLICATIONS

Company brouchure, "Gleason No. 102 Straight Bevel CONIFLEX® Generator", The Gleason Works, Rochester, NY.
Goldrich, Robert N., "CNC Generation of Spiral Bevel and Hypoid Gears: Theory and Practice", ECAM Conference, Lyon, France, Jun. 20-22, 1990, pp. 1-9.
International Search Report and Written Opinion for PCT/US2006/038795.

* cited by examiner

*Primary Examiner*—Erica Cadugan
(74) *Attorney, Agent, or Firm*—Robert L. McDowell (57) ABSTRACT

A method and tool arrangement for producing straight bevel gears and the like on a multi-axis computer controlled machine wherein a single tool is utilized in the machining process.

6 Claims, 8 Drawing Sheets

MANUFACTURING STRAIGHT BEVEL GEARS

This application claims the benefit of U.S. Provisional Patent Application No. 60/723,396 filed Oct. 4, 2005, the entire disclosure of which is hereby incorporated by reference.

FIELD OF THE INVENTION

The present invention is directed to the manufacture of bevel gears and in particular, the manufacture of straight bevel gears.

BACKGROUND OF THE INVENTION

It is known to produce straight bevel gears, as well as skew bevel gears, face couplings and splined parts, by providing a pair of inclined rotary cutting tools whose rotating cutting blades effectively interlock to simultaneously cut the same tooth space on a workpiece. Examples of this type of machining can be seen, for example, in U.S. Pat. Nos. 2,586,451 to Wildhaber; 2,567,273 and 2,775,921 to Carlsen; 2,947,062 to Spear or in the company brochure "Number 102 Straight Bevel Coniflex® Generator" published by The Gleason Works.

Straight bevel gears may be formed by a non-generating process where the inclined tools are plunged into the workpiece to form a tooth slot with the profile surface of the tooth being of the same form as that of the blade cutting edge. Alternatively, tooth surfaces may be generated wherein the inclined tools are carried on a machine cradle which rolls the tools together with the workpiece to form a generated profile surface on the workpiece. In either instance, the tools may also include cutting edges that are disposed at a slight angle (e.g. 3°) to the plane of cutter rotation. Such an angled cutting edge, in conjunction with the inclination of the tools, removes more material at the ends of a tooth slot thereby resulting in lengthwise curvature of the tooth surface (i.e. lengthwise ease-off) for tooth bearing localization.

It is also known from U.S. Pat. No. 2,342,129 to Elbertz to provide a machine and process for cutting straight bevel gears wherein a single tool is utilized to cut a first portion of a tooth slot followed by a 180° repositioning of the tool or workpiece and subsequently utilizing the tool to cut the remainder of the tooth slot. The path of the tool relative to the workpiece is controlled by a master surface and guides. Lengthwise crowning is not possible with the process of Elbertz given a lack of tool inclination and the cutter would cut shallow at the tooth ends thereby leaving extra metal at the tooth ends. Also with Elbertz, repositioning a work head or tool head by 180° is time consuming and lends itself to machining inaccuracies due to shifting the large mass of a work head or tool head over a considerable travel distance in order to machine the entire tooth slot.

SUMMARY OF THE INVENTION

The present invention is directed to producing straight bevel gears and the like on a multi-axis computer controlled machine wherein a single tool is utilized in the machining process.

DETAILED DESCRIPTION OF THE PREFERRED EMBODIMENT

The details of the present invention will now be discussed with reference to the accompanying drawings which represent the invention by way of example only. In the drawings, like components will be referred to by the same reference numbers. Although the preferred embodiments will be discussed with reference to straight bevel gears, the present invention is not limited thereto but is intended to include similar types of toothed members, such as, for example, skew bevel gears, face couplings and splined shafts.

Figure 1:
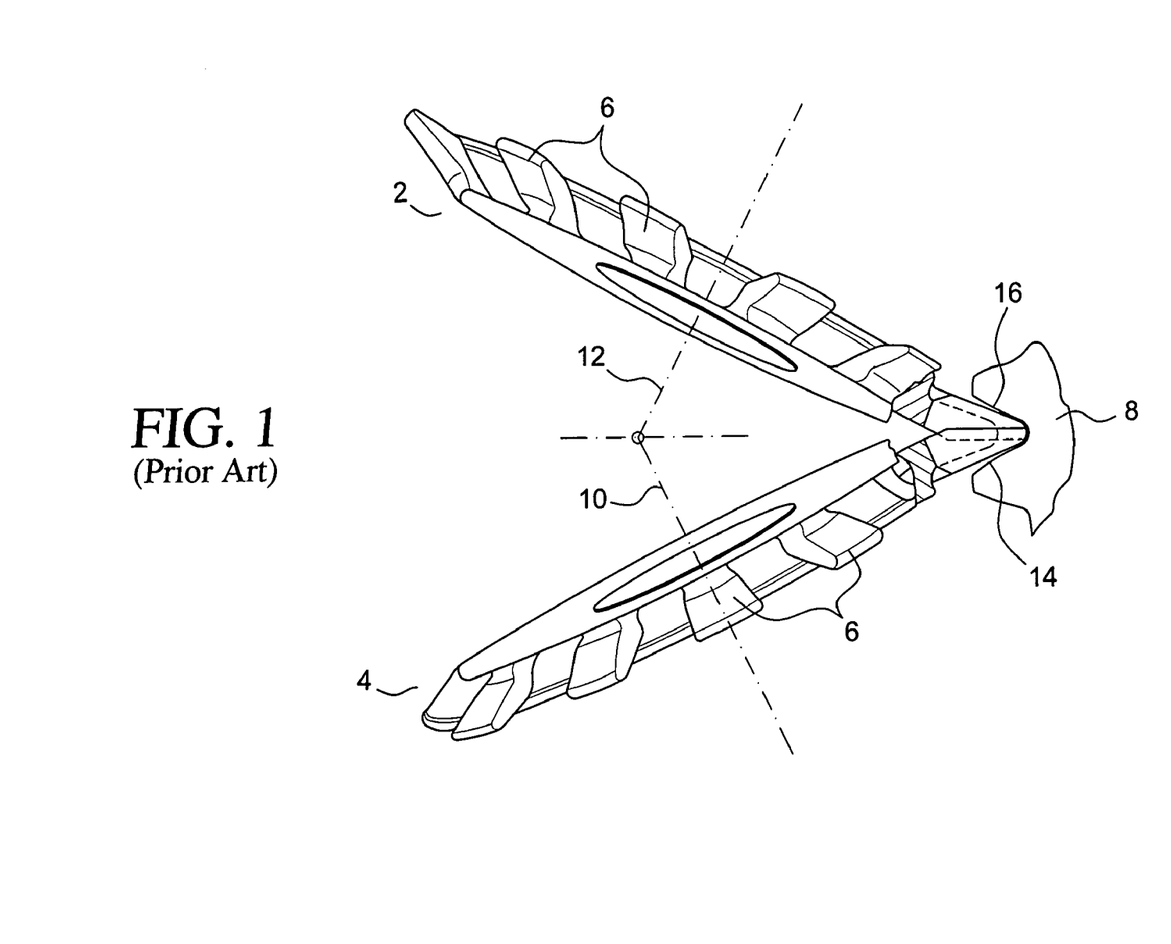
FIG. 1 shows the interlocking arrangement of a pair of inclined cutters cutting a tooth slot in a workpiece.

FIG. 1 illustrates the prior art arrangement of a pair of inclined rotary disc cutters 2, 4 (commonly referred to and upper and lower cutters) having cutting blades 6 for cutting a tooth slot in a workpiece 8. Cutter 2 is rotatable about axis 12 and cutter 4 is rotatable about axis 10. In a generating process on a conventional mechanical cradle-style machine, the inclined cutters 2, 4 are usually fed into the workpiece to a predetermined depth and a generating roll of the machine cradle (not shown) is commenced in a synchronized manner with rotation of the workpiece 8 to generate tooth profile surfaces 14, 16.

Figure 2:
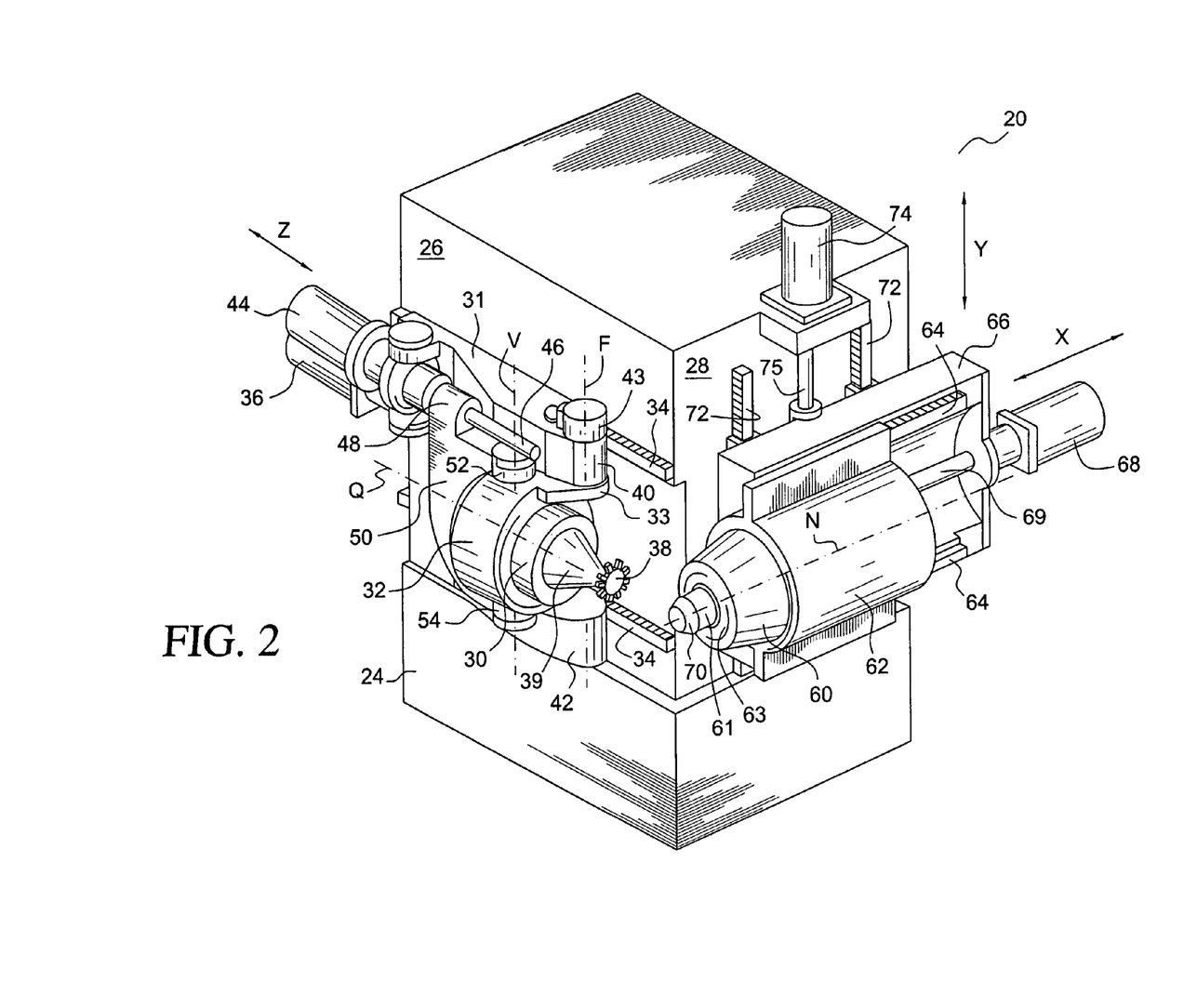
FIG. 2 is an example of a machine for carrying out the present inventive method.

The invention contemplates cutting straight bevel gears on any of the so-called 6-axis CNC gear manufacturing machines (commonly referred to as "free-form" machines) such as, for example, those machines described in U.S. Pat. Nos. 6,712,566; 4,981,402 or 5,961,260. FIG. 2 shows a machine 20 of the type disclosed in U.S. Pat. No. 6,712,566, the disclosure of which is hereby incorporated by reference. While this type of machine has heretofore been disclosed as producing spiral bevel and hypoid gears utilizing face milling or hobbing type cutters wherein cutting blades project from the front surface of a cutter head, the inventors have now discovered that a single cutting disc, with radially extending cutting blades, such as cutter 2 or 4 in FIG. 1, can be positioned on machines such as that of FIG. 2 and manipulated in such a manner that straight bevel gears can be produced.

The machine 20 of FIG. 2 will now be described. For ease in viewing the various machine components, FIG. 2 illustrates the inventive machine without doors and exterior sheet metal. The machine 20 comprises a single stationary column 24 preferably a monolithic structure such as cast iron or mineral cast but may be assembled from other elements such as metal plates (e.g. steel or cast iron) or individual frame elements such as corner posts and support elements. Column 24 comprises first side 26 and second side 28, being oriented at a desired angle, preferably perpendicular, to one another. Each of the first and second sides comprises a width and a height (as viewed in FIG. 2). Alternatively, monolithic column 24 may comprise a form having non-planar sides such as, for example, a generally cylindrical column.

First side 26 includes first spindle 30 rotatable about axis Q and is preferably driven by a direct drive motor 32, preferably liquid-cooled, and preferably mounted behind front and rear spindle bearings (not shown). Spindle 30 is pivotably secured to a spindle support 31 which, along with spindle 30, is movable in direction Z along the width of first side 26 on ways 34 attached to column 24. Movement of spindle 30 in direction Z is provided by motor 36 through a direct-coupled ballscrew (not shown) or by direct drive.

A cutting or grinding tool 38 (cutting tool is shown) is releasably mounted to spindle 30 by mounting equipment 39. The cutting tool 38 is a single tool and is preferably of the type as shown by cutter 2 or 4 of FIG. 1 comprising a plurality of cutting blades projecting radially (with respect to the rotational axis of the tool) from the periphery of the tool body. Each cutting blade comprises a cutting edge, front surface, clearance edge, clearance side surface, tip and back surface. The cutting blades of the tool 38 also preferably include a cutting edge that is disposed at a slight angle (e.g. 3°-4°) to the plane of cutter rotation thus giving the cutter a slight dish shape. This angle is referred to as a "dish angle".

As stated above, first spindle 30 is attached to spindle support 31 such that any pivoting of the spindle, and hence the tool 38, may occur about pivot axis F. Spindle bracket 33 is pivotally attached to support 31 via at least one, and preferably two, bearing connections 40 and 42, upper bearing connection 40 and lower bearing connection 42. Pivoting of spindle 30 is effected by motor 44 and direct-coupled ballscrew 46, or by direct drive, acting through sleeve portion 48 of yolk 50. Yolk 50 is pivotally attached to spindle 30 preferably at an upper connection 52 and a lower connection 54 such that yolk 50 may angularly move relative to spindle 30 about axis V. Advancing of ballscrew 46, and hence yolk 50, effectively pushes drive motor 32 angularly away from column 24 thereby causing a pivot motion about axis F to angularly move the tool 38 toward the machine column 24. Of course, retracting ballscrew 46 has the opposite effect. Alternatively, to effect pivoting of spindle 30, a slide movable on at least one guideway oriented in the Z direction and positioned on spindle support 31 may be connected to spindle 30 or motor 42 via a linkage mechanism. Movement of the slide on the guideway effects pivoting of spindle 30 about axis F. A further alternative is to include a motor at one or both of bearing connections 42 and 43 to effect pivoting of spindle 30.

Second side 28 includes second spindle 60 which is rotatable about axis N and is preferably driven by a direct drive motor 62, preferably liquid-cooled, and preferably mounted behind front and rear spindle bearings (not shown). Spindle 60 is movable in direction X along the width of second side 28 on ways 64 attached to slide 66. Movement of spindle 60 in direction X is provided by motor 68 through a direct-coupled ballscrew 69 or by direct drive. Preferably, a workpiece (a pinion 70 in FIG. 2 or a ring gear) is releasably mounted to spindle 60 by suitable workholding equipment 61 as is known in the art. Spindle 60 is also movable in direction Y along the height of second side 28 since slide 66 is movable in the Y direction via ways 72 with movement being provided by motor 74 through a direct-coupled ballscrew 75 or by direct drive. Directions X, Y and Z are preferably mutually perpendicular with respect to one another although one or more may be inclined with respect to its perpendicular orientation. For purposes of illustration, in all Figures, the Y direction is vertical.

Movement of first spindle 30 in direction Z, second spindle 60 in direction X, second spindle 60 via slide 66 in direction Y, pivoting of first spindle 30 about axis F, as well as first spindle 30 rotation and second spindle 60 rotation, is imparted by the separate drive motors 36, 68, 74, 44, 32 and 62 respectively. The above-named components are capable of independent movement with respect to one another or may move simultaneously with one another. Each of the respective motors is preferably associated a feedback device such as a linear or rotary encoder, such as pivot axis encoder 43 (FIG. 2), as part of a CNC system which governs the operation of the drive motors in accordance with instructions input to a computer controller (i.e. CNC) such as the Fanuc model 160i or Siemens model 840D (not shown).

Figure 3:
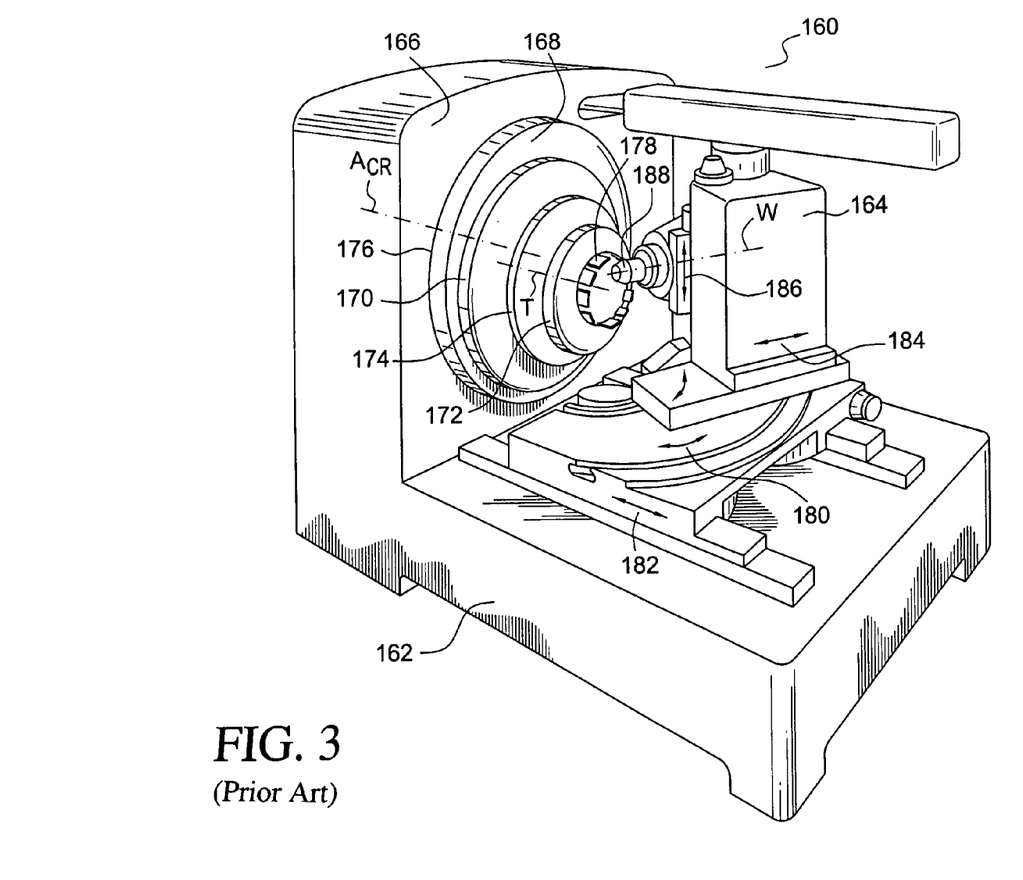
FIG. 3 illustrates a basic bevel gear generating machine.

The machine of the present invention as illustrated by the embodiments is guided by the controller which preferably continuously issues positioning and/or velocity commands to the various drive motors. A set of formulas may be developed for the configuration of the machine of FIG. 2. However, it is preferable to use the same input parameters as a conventional mechanical cradle-style gear generating machine (the "basic" machine as seen in FIG. 3) for other machines having a different number and/or configuration of axes. In other words, the positions of the tool and workpiece axes in the coordinate system of a conventional mechanical cradle-style bevel gear generating machine are transformed into the alternative coordinate system of the multi-axis machine, such as the machine of FIG. 2. Examples of this type of transformation can be found in previously mentioned and commonly assigned U.S. Pat. No. 6,712,566 or in commonly assigned U.S. Pat. No. 4,981,402 the disclosure of which is hereby incorporated by reference.

FIG. 3 illustrates a conventional mechanical cradle-style bevel gear generating machine 160 for producing bevel gears. The machine generally comprises a machine frame 162, work support mechanism 164 and a cradle support 166 comprising a cradle mechanism 168. Traditionally, conventional mechanical cradle-style bevel gear generating machines are usually equipped with a series of linear and angular scales (i.e. settings) which assist the operator in accurately locating the various machine components in their proper positions. The following is a description of settings found on a tilt-equipped conventional mechanical cradle-style bevel gear generating machine such as the machine shown in FIG. 3:

Eccentric Angle 170 controls the distance between the cradle axis, $A_{CR}$, and the tool axis, T, Tool Spindle Rotation Angle 172 controls the angle between the cradle axis and the tool axis, commonly called the tilt angle, Swivel Angle 174 controls the orientation of the tool axis relative to a fixed reference on the cradle 188, Cradle Angle 176 positions the tool 178 at some angular position about the cradle axis, Root Angle 180 orients the work support 164 relative to the cradle axis, Sliding Base 182 is a linear dimension which regulates the depth of tool engagement with the workpiece, Head Setting 184 is a linear adjustment of the work support 164 along the workpiece axis, W, and, Work Offset 186 controls the offset of the workpiece axis relative to the cradle axis.

A final setting, ratio-of-roll, governs the relative rotational motion between the cradle 168 and workpiece 188. It should be noted that some of the above machine settings must be calculated taking into account the following workpiece and tooling design specifications:

the mounting distance of the blank workpiece (symbol—$M_d$), the overall length of the work holding equipment (symbol—$A_b$), and, the overall height of the tool (symbol—h).

The inventors have discovered that straight bevel gears may be produced on a multi-axis gear generating machine, such as in FIG. 2, by utilizing a single cutting disc (e.g. either cutter 2 or 4 of FIG. 1), in contrast to the inclined pair of interlocking cutting discs as seen in the previously mentioned prior art. The single disc type cutting tool is positioned relative to a workpiece to cut a first portion of a tooth slot. The tool and workpiece are then repositioned with respect to one another and the same tool is utilized to cut the remaining portion of the tooth slot.

In the present invention, since the conventional mechanical style straight bevel gear generating machines comprise two skewed cutter axes, the inventive cutting cycle is preferably split into a two-cut cycle. Initially, a first transformation is made from the machine axes settings of one of the skewed cutters of the conventional mechanical style straight bevel gear generating machine (the mechanical machine "summary") to the axes settings of a theoretical cradle-style bevel gear generating machine known as a "basic" machine (FIG. 3). Such basic settings are then transformed to the axes arrangement of the multi-axis machine (as discussed in U.S. Pat. No. 6,712,566 or U.S. Pat. No. 4,981,402 above) for cutting a first portion of a tooth slot of a straight bevel gear. A second series of transformations, based on the other of the skewed axis cutters of the mechanical machine, is similarly made to the multi-axis machine for cutting the remaining portion of the tooth slot of the straight bevel gear.

Straight bevel gear cutting summaries of processes that use interlocking cutters contain the following gear geometry relevant settings. The settings of Group 1 are initially identical for the upper and lower cutters but may be changed in the course of contact optimizations on the mechanical machine. The settings of Group 2 are always identical for the upper and lower cutters in the mechanical machine. In the free-form machines, all settings of Group 1 and Group 2 may be changed in order to optimize a pinion or ring gear.

Group 1
Space Angle
Cutter Offset
Cutter Cone Distance
Cutter Swing Angle
Group 2
Cradle Test Roll
Work Test Roll
Start Roll Position
End Roll Position
Machine Root Angle
Sliding Base For the correct positioning of the cutter in the mechanical machine, the tool related dimensions of Group 3 are required:

Group 3
Actual Cutter Diameter
Cutter Reference Height

In order to convert a summary of a mechanical machine into basic settings, the machine constants of Group 4 are additionally required:

Group 4
Cutter Tilt Angle
Swing Axis Constant
Cutter Gage Reference Radius

Figure 4:
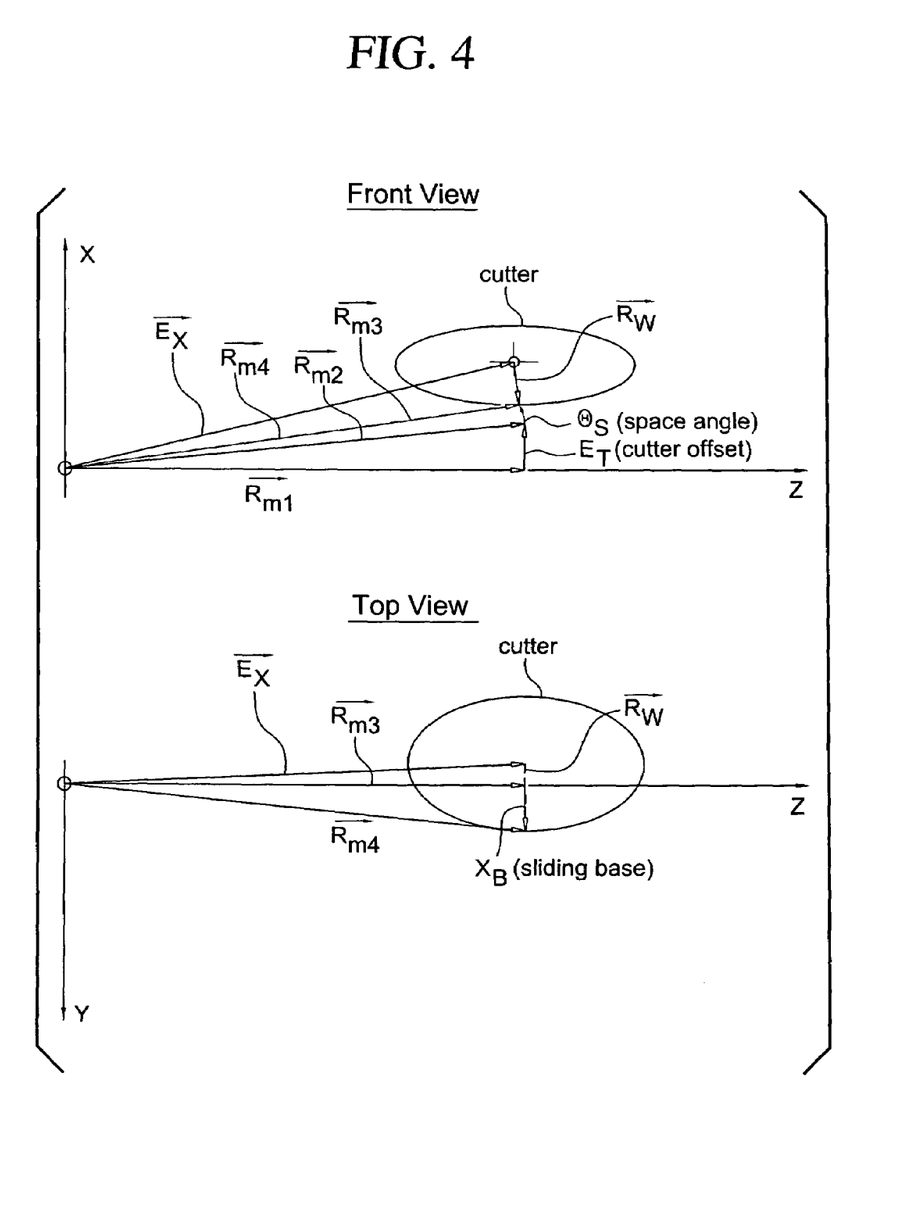
FIG. 4 illustrates the conversion of the upper cutter of an interlocking cutter arrangement from the summary items of a mechanical straight bevel generating machine into basic machine settings.

FIG. 4 illustrates the conversion of the upper cutter of an interlocking cutter arrangement from the summary items of a mechanical straight bevel generating machine into basic machine settings. With reference to FIG. 4 and the following equations, the conversion from the conventional mechanical style straight bevel gear generating machine (upper cutter) to the basic bevel gear generating machine will be described. The analog approach has to be performed for the lower cutter, which results in different basic settings. The portions of each tooth slot (flanks 1) cut with the free-form machine at an upper position are cut with the basic settings resulting from FIG. 4. The portions of each tooth slot (flanks 2) cut with the free-form machine at a lower position are cut with the basic settings resulting from the analog conversion of the summary items.

The initial vector to the center of the workpiece:

$$\vec{R}_{m1} = \begin{Bmatrix} 0 \\ 0 \\ A_C \end{Bmatrix}_i \text{ where } A_C = \text{cutter cone distance.} \quad (1)$$

Adding cutter offset:

$$\vec{R}_{m2} = \vec{R}_{m1} + \begin{Bmatrix} E_T \\ 0 \\ 0 \end{Bmatrix} \text{ where } E_T = \text{cutter offset.} \quad (2)$$

Rotating about the space angle:

$$\vec{R}_{m3} = \begin{pmatrix} \cos\theta_s & 0 & \sin\theta_s \\ 0 & 1 & 0 \\ -\sin\theta_s & 0 & \cos\theta_s \end{pmatrix} \vec{R}_{m2} \text{ where } \theta_s = \text{space angle} \quad (3)$$

Adding the sliding base position:

$$\vec{R}_{m4} = \vec{R}_{m3} + \begin{Bmatrix} 0 \\ X_b \\ 0 \end{Bmatrix} \text{ where } x_b = \text{sliding base} \quad (4)$$

The initial cutter radius vector:

$$\vec{R}_{w0} = \begin{Bmatrix} 0 \\ R_{CP} \\ 0 \end{Bmatrix} \text{ where } R_{CP} = \text{cutter radius} \quad (5)$$

Rotating about the cutter tilt:

$$\vec{R}_{w1} = \begin{pmatrix} \cos\phi_X & -\sin\phi_X & 0 \\ \sin\phi_X & \cos\phi_X & 0 \\ 0 & 0 & 1 \end{pmatrix} \vec{R}_{w0} \quad (6)$$

where $\phi_X$=cutter tilt (inclination of cutter in mechanical machine)

Calculating the initial cutter position vector:

$$\vec{E}_{X1} = \vec{R}_{m4} - \vec{R}_{W1} \quad (7)$$

Rotation about the space angle:

$$\vec{E}_{X2} = \begin{pmatrix} \cos\theta_S & 0 & \sin\theta_S \\ 0 & 1 & 0 \\ -\sin\theta_S & 0 & \cos\theta_S \end{pmatrix} \vec{E}_{X1} \quad (8)$$

A cutter axis matrix is established from j rotation about Y-axis and i rotation about X-axis:

$$(T_{K1}) = \begin{pmatrix} \cos j & 0 & \sin j \\ 0 & 1 & 0 \\ -\sin j & 0 & \cos j \end{pmatrix} \begin{pmatrix} 1 & 0 & 0 \\ 0 & \cos i & -\sin i \\ 0 & \sin i & \cos i \end{pmatrix} \quad (9)$$

$i = \text{tilt} = 90° - \varphi x$ $j = \text{swivel} = 90°$ for upper cutter ($-90°$ for lower cutter)

Including rotation about the space angle $\theta_S$:

$$(T_{K2}) = \begin{pmatrix} \cos\theta_S & 0 & \sin\theta_S \\ 0 & 1 & 0 \\ -\sin\theta_S & 0 & \cos\theta_S \end{pmatrix} (T_{K1}) \quad (10)$$

Basic settings calculations:

Radial Distance $S = \sqrt{(E_{X2_x})^2 + (E_{X2_z})^2}$ (11)

Center Roll position $q_0 = \arctan(E_{X2_x}/E_{X2_z})$ (12)

Swivel Angle $j = -q_0 + \arctan[(T_{K2})_{1,2}/(T_{K2})_{3,2}]$ (13)

Tilt Angle $i = \arccos[(T_{K2})_{2,2}]$ (14)

Machine Root Angle $\gamma_m = \gamma_{m(mechanical\ machine)}$ (15)

Ratio of Roll $R_A = \dfrac{WTSTR}{CTSTR}$ (16)

where WTSTR=work test roll (job specific)
CTSTR=cradle test roll (job specific)

The transformation of the basic-machine settings to the axis positions of the multi-axis free-form machine is accomplished according to the method disclosed in previously discussed U.S. Pat. No. 6,712,566 or U.S. Pat. No. 4,981,402.

Figure 5:
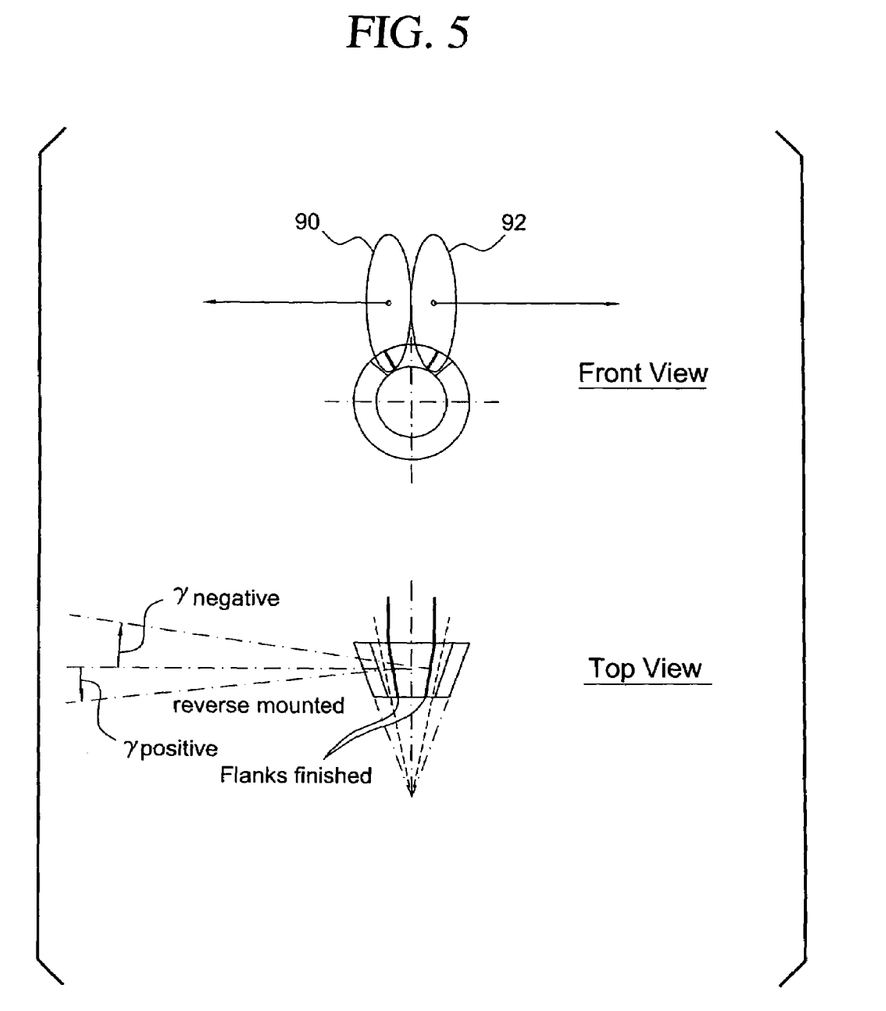
FIG. 5 illustrates mounting a cutter disc in a reversed manner.

Preferably, the mounting position of a cutter disc on the free-form machine is reversed with respect to the mounting position found on the mechanical style straight bevel gear generating machine. For example, in the free-form machine of FIG. 2, the mounting position of a cutter disc 2 (shown in FIG. 1) on the tool spindle would preferably reversed by 180 degrees (i.e. reversed mounted) such that the visible top portion of cutter disc 2 seen in FIG. 1 would be positioned adjacent to the tool spindle of the free-form machine. FIG. 5 illustrates that mounting the cutter disc in this reversed manner 90 eliminates the need for a negative machine root angle which would be required if the cutter disc were mounted to the free-form spindle in the same manner 92 as it is mounted on the spindle of the mechanical machine. Many machines are quite limited with respect to the amount of travel in the negative root angle direction (e.g. minus 3–4 degrees maximum) so reducing or eliminating the need for negative root angle travel is advantageous.

Figure 6:
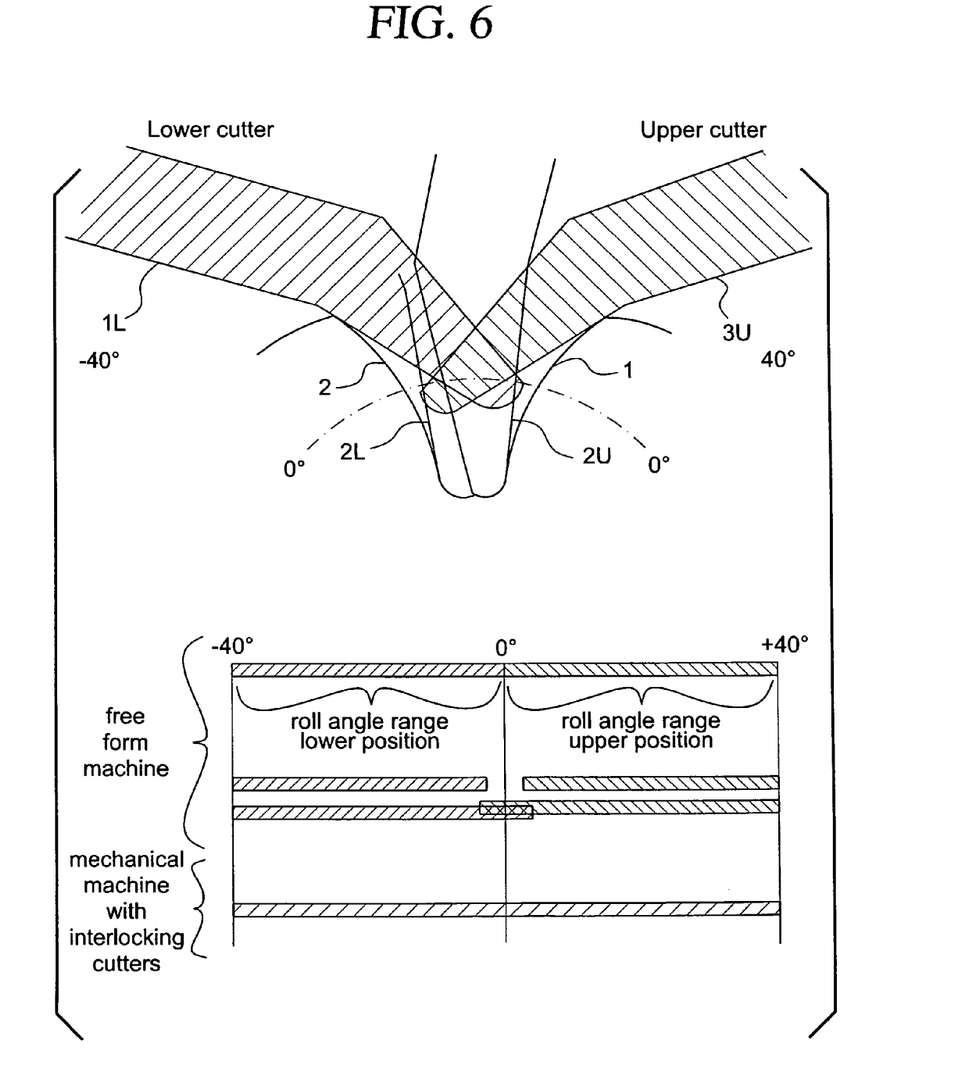
FIG. 6 is a comparison of the generating roll range for a mechanical machine and a free-form machine.

FIG. 6 shows that for the upper cutter in a mechanical machine, generating the complete involute of flank 1 requires a generating roll between positions 2U and 3U which in this example is 40°. The lower cutter in the mechanical machine is required to roll from position 2L to 1L which in this example is also 40°. Thus, to fully generate both flanks 1 and 2 in FIG. 6 with the pair of interlocking type cutters of the conventional mechanical machine, it is required to perform a generating roll from position 1L to position 3U which amounts to a total roll range of 80°.

Figure 7:
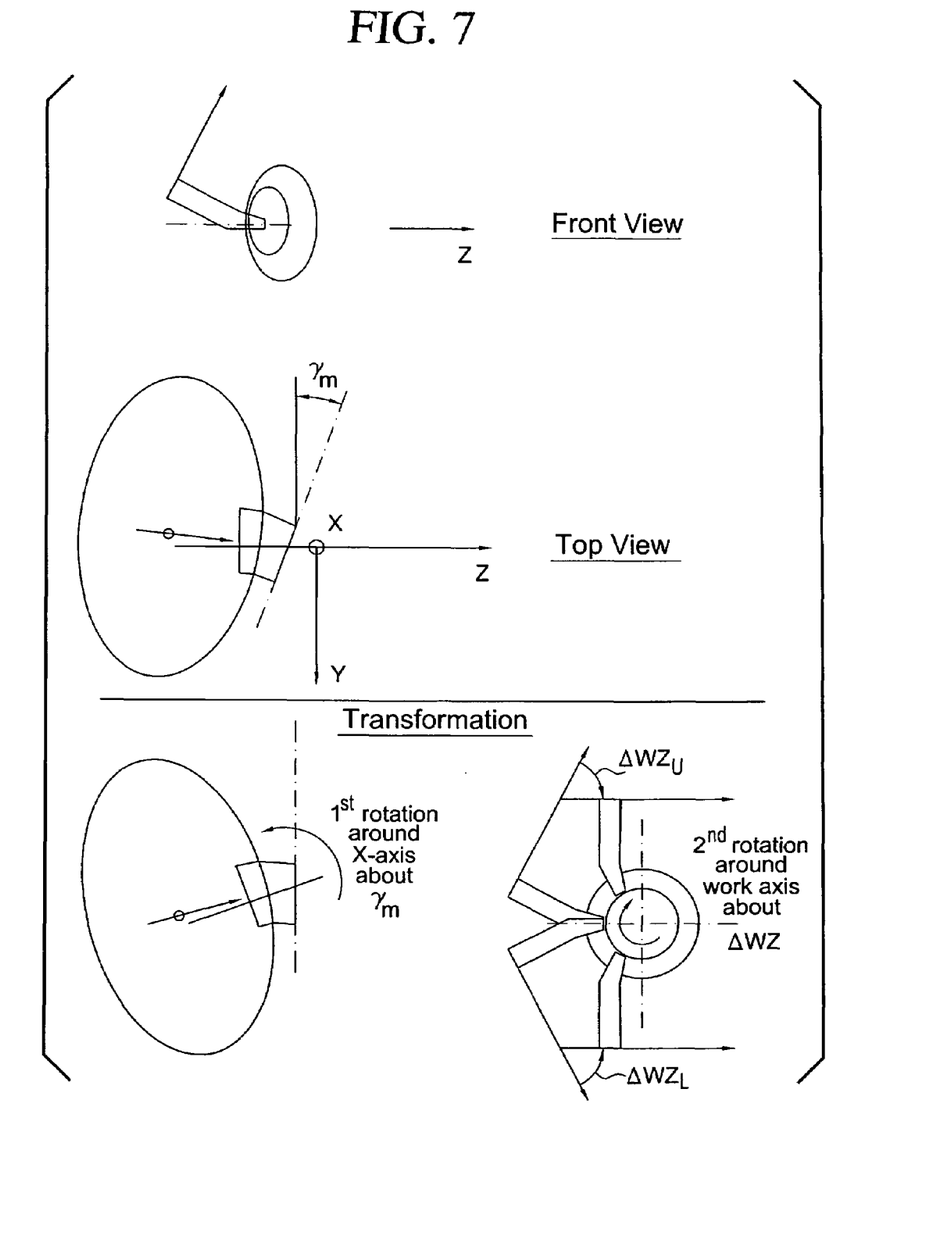
FIG. 7 illustrates the set over rotation between the upper cutting of a tooth flank and the lower cutting of a tooth flank.

In a free-form machine, it is only necessary to roll (generate) either cutter through the required range for the particular flank. The additional rolling in the mechanical machine can cause undercut and mutilations and can be avoided in the free-form machine. The graph portion of FIG. 6 shows different possibilities of roll ranges:

Free-Form Machine:
  Seamless rolling between $-40°$ to $0°$ of lower position and $0°$ to $+40°$ of upper position
  Gap between lower and upper roll range
  Overlap between lower and upper roll range.
Mechanical Machine
  Only one roll range from $-40°$ to $+40°$ of interlocking cutters FIG. 7 shows the upper cutter as positioned in the mechanical machine and represented by the basic settings in a front view as well as a top view. A first rotation around the X-axis of the indicated coordinate system about the machine root angle $\gamma_m$ lines up the workpiece axis with the Y-axis of the coordinate system. A second rotation around the Y-axis until the cutter axis vector is horizontal and does not contain a component in the X-axis direction is necessary to determine the angle $\Delta WZ_U$. This is the position cutter and workpiece have in the free-form machine with respect to the relationship between workpiece and cutter while the cutter axis is horizontal. In case of cutting the first (upper) tooth flank, this is not significant. In the case of cutting the second (lower) tooth flank it is important in order to achieve the correct tooth slot width to rotate the workpiece back to the neutral position about $-\Delta WZ_U$ and then it has to be rotated about $\Delta WZ_L$ against the rotation indicated in FIG. 7 to the lower position. The above may be expressed as:

$$(T_{K3}) = \begin{pmatrix} 1 & 0 & 0 \\ 0 & \cos\gamma_m & -\sin\gamma_m \\ 0 & \sin\gamma_m & \cos\gamma_m \end{pmatrix} (T_{K2}) \quad (17)$$

$$\Delta WZ_U = \arctan\dfrac{(T_{K3})_{1,2}}{(T_{K3})_{2,2}} \quad (18)$$

where $$\begin{Bmatrix} (T_{K3})_{1,2} \\ (T_{K3})_{2,2} \\ (T_{K3})_{3,2} \end{Bmatrix}$$

represent the cutter axis vector.

$\Delta WZ_L$ is calculated analog using the cutter axis vector of the basic settings of the lower cutter of the mechanical machine.

The set over rotation between the upper cutting of flank 1 and the lower cutting of flank 2 in order to cut the correct tooth slot width in the correct position is therefore expressed as:

$$\Delta WZ = \Delta WZ_U + \Delta WZ_L \tag{19}$$

It should be understood that one cutter in the free-form machine can represent both cutters of the mechanical machine. The lower section of the cutter represents the upper cutter and the upper section of the cutter represents the lower cutter. This is the reason why the single cutter is moved in the free-form machine (after conversion to basic settings and transformation of the basic settings to free-form coordinates) in the upper position, using the summary of the mechanical machine for the upper cutter, and in the lower position, using the summary of the lower cutter of the mechanical machine. Likewise, the correct work rotational position has to be established with a phase angle rotation of $\Delta WZ$.

Figure 8:
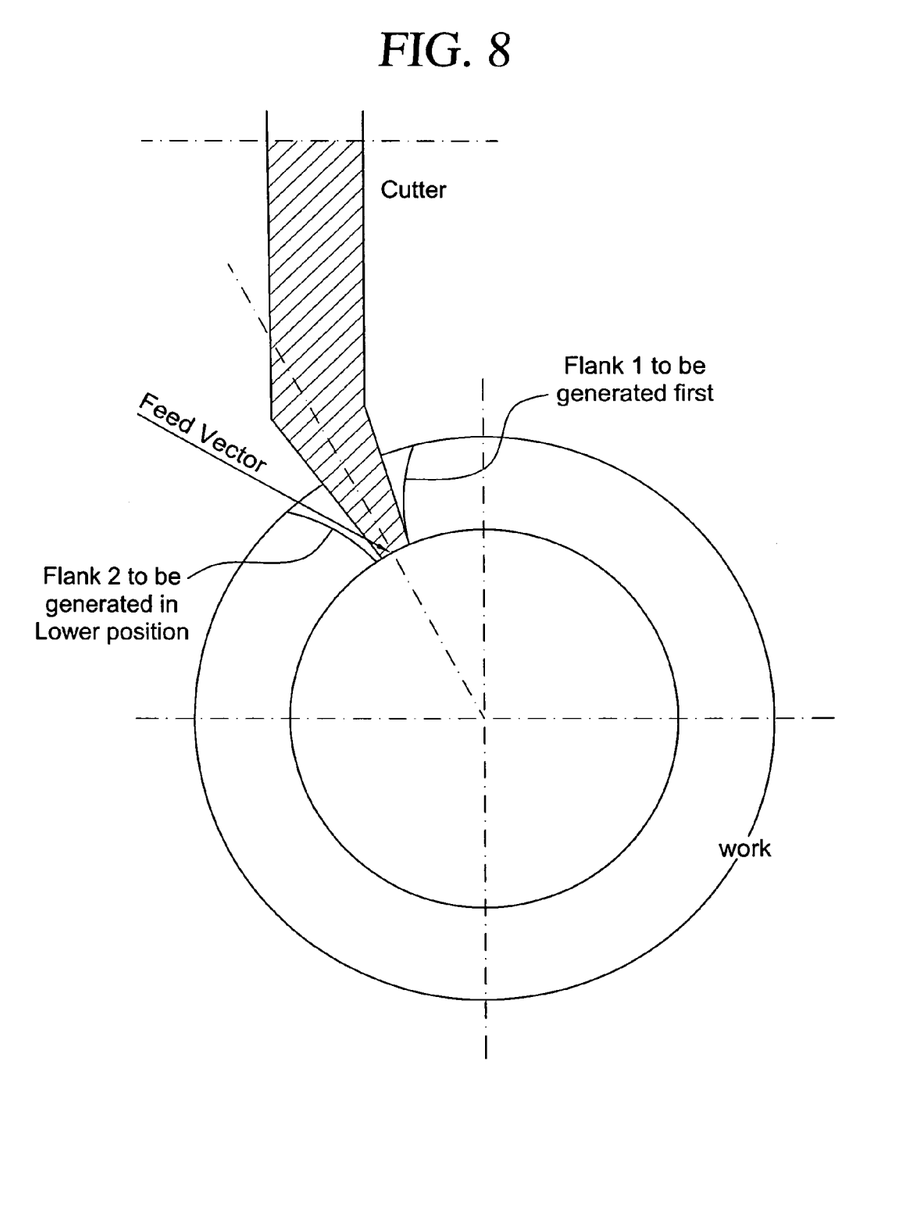
FIG. 8 shows a vector feed approach for engaging the workpiece and cutter.

As the upper tooth slot is cut first in the above discussion it is important to approach the workpiece with the cutter in a manner to prevent cutting by the clearance side of the cutter blades. FIG. 8 illustrates the cutter in the start roll position. The feed vector is derived in the final plunge position at the start roll position attached to the clearance corner of the cutter at the center face width such that enough stock is left on the not yet engaged flank 2. The feed vector is preferably perpendicular to the root at the mean face width.

Although discussed with respect to cutting, the present invention is also applicable to grinding because it converts a method of using interlocking cutters into a method of cutting with a single cutter. In a grinding machine, a grinding wheel can be dressed to duplicate the enveloping surface of the cutting edges which therefore enables a defined hard finishing of straight bevel gears preserving the identical flank form.

It should be understood that the sequence of cutting steps is not critical. For example, although in the above example a tooth slot is formed by a first cut at a top position and a second cut at a bottom position, a tooth slot may instead be first cut at the bottom position followed by a final cut at the top position. Alternatively, all slots in a workpiece may be cut at one of the top or bottom position followed by the remainder of all slots being cut at the other of the top or bottom position.

The present method minimizes the amount of machine travel (and hence time) for repositioning the tool with respect to the workpiece. With reference to FIG. 2, it can be seen that repositioning requires movement essentially in the Y direction only and for a distance approximately equal to the combined diameters of the tool and workpiece. Repositioning does not require swinging a large mass through an arc to a new position. Generation of a tooth slot does not require a master surface and guides. Furthermore, with a dish-shaped tool and the combination of machine axes motions, lengthwise crowning can be produced.

The present invention also contemplates the transformation of the settings of the mechanical machine directly into the axis positions of the free-form machine in a single transformation step.

While the invention has been described with reference to preferred embodiments it is to be understood that the invention is not limited to the particulars thereof. The present invention is intended to include modifications which would be apparent to those skilled in the art to which the subject matter pertains.

What is claimed is:

1. A method of machining bevel gears on a multi-axis free-form gear generating machine, said method comprising:
providing axes settings from a first machine comprising first and second tools each having stock removing surfaces, said first and second tool each being positioned in an inclined manner in said first machine whereby upon rotation during machining an interlocking arrangement of the stock removing surfaces of the first and second tools is formed to machine a tooth slot,
transforming axes settings of the first inclined tool of said first machine to axes settings of a basic gear generating machine,
transforming said axes settings of said basic gear generating machine to the axes settings of said multi-axis free-form gear generating machine,
machining a first portion of a tooth slot in a workpiece on said multi-axis free-form machine, said machining being carried out with a tool having the form of one of said first and second tools.

2. The method of claim 1 further comprising:
transforming axes settings of said second inclined tool of said first machine to axes settings of a basic gear generating machine,
transforming said axes settings of said basic gear generating machine to the axes settings of said multi-axis free-form gear generating machine,
machining a remaining portion of said tooth slot in a workpiece, said machining of said remaining portion being carried out with said tool having the form of one of said first and second tools.

3. The method of claim 2 wherein said first portion of all tooth slots in said workpiece are machined followed by machining of said remaining portion of all tooth slots of said workpiece.

4. The method of claim 1 wherein said tool having the form of one of said first and second tools and said workpiece are moved relative to one another in a manner wherein said tool having the form of one of said first and second tools is fed into said workpiece along a vector path.

5. The method of claim 1 wherein said tool having the form of one of said first and second tools is a cutting tool.

6. The method of claim 1 wherein said tool having the form of one of said first and second tools is a grinding wheel.

* * * * *